(12) United States Patent
Lacaze et al.

(10) Patent No.: US 11,345,370 B2
(45) Date of Patent: May 31, 2022

(54) AUTONOMOUS AMBULANCE

(71) Applicant: ROBOTIC RESEARCH OPCO, LLC, Clarksburg, MD (US)

(72) Inventors: Alberto Daniel Lacaze, Potomac, MD (US); Karl Nicholas Murphy, Rockville, MD (US)

(73) Assignee: ROBOTIC RESEARCH OPCO, LLC, Clarksburg, MD (US)

( * ) Notice: Subject to any disclaimer, the term of this patent is extended or adjusted under 35 U.S.C. 154(b) by 131 days.

(21) Appl. No.: 16/597,893

(22) Filed: Oct. 10, 2019

(65) Prior Publication Data
US 2021/0107523 A1 Apr. 15, 2021

(51) Int. Cl.
| | |
|---|---|
| *B60W 60/00* | (2020.01) |
| *G01C 21/34* | (2006.01) |
| *G06K 9/00* | (2022.01) |
| *G05D 1/00* | (2006.01) |
| *G06N 3/08* | (2006.01) |
| *G06V 20/58* | (2022.01) |

(52) U.S. Cl.
CPC ..... *B60W 60/0025* (2020.02); *G01C 21/3415* (2013.01); *G05D 1/0033* (2013.01); *G06N 3/08* (2013.01); *G06V 20/58* (2022.01); *B60W 2300/105* (2013.01); *G05D 2201/0213* (2013.01)

(58) Field of Classification Search
CPC ........ B60W 60/0025; B60W 2300/105; G01C 21/3415; G06K 9/00805; G06K 9/00791; G06N 3/08; G05D 1/0033; G05D 2201/0213; G08G 1/00
See application file for complete search history.

(56) References Cited

U.S. PATENT DOCUMENTS

2018/0082219 A1* 3/2018 Bryson .................. G06Q 10/00

OTHER PUBLICATIONS

Franz, Julia "Does the idea of a self-driving ambulance freak you out?" Apr. 2, 2017 Science Friday https://www.pri.org/stories/2017-04-02/does-idea-self-driving-ambulance-freak-you-out (Year: 2017).*
Varun Gowda, Sameer Shah, Balakumar Gardampaali "Concept Of Self-Driven Ambulance Synchronized With Live GPS Feed For Faster And Safe Transport Of Patients" Journal of Engineering Research and Application ISSN : 2248-9622 vol. 8, Issue 11 (Part-II) Nov. 2018, pp. 32-36 (Year: 2018).*

* cited by examiner

*Primary Examiner* — Brian P Sweeney
(74) *Attorney, Agent, or Firm* — RowanTree Law Group, PLLC; Frederick F. Rosenberger

(57) ABSTRACT

The present invention pertains to the development of a ground autonomous ambulance that is designed to follow routes that is comprised of an autonomous vehicle that includes a drive by wire kit, a database storing the collection routes, a database of rules of the road and/or other legal allowable behavior, sensors for detecting the pedestrians, cars, and other road obstacles, and a control system that controls the vehicle to follow routes and which is capable of carrying and securing a stretcher or wheelchair. The autonomous ambulance also has a robotic stretcher which is used for transporting patients from their residences or other emergency locations to the ambulance.

20 Claims, 5 Drawing Sheets

AUTONOMOUS AMBULANCE

CROSS-REFERENCES TO OTHER APPLICATIONS

None.

STATEMENT REGARDING FEDERAL SPONSORSHIP

No part of this invention was a result of any federally sponsored research.

FIELD OF THE INVENTION

The invention pertains to the development of an autonomous ambulance that can transport patients to the nearest emergency room and perform many of the functions traditionally performed by humans inside the ambulance.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

The statements in this section merely provide background information related to the present disclosure and may not constitute prior art.

Medical rescue and evacuation teams have been used to rescue and evacuate injured patients to treatment centers. In modern times, the use of drones or unmanned aerial vehicles (UAVs) has become an emergent technology for precise and rapid short distance delivery. While some commercial drone have been repurposed for medical services, they continue to suffer from the same limitations of their delivery counterpart, that is that they are meant for small payloads over the course of short distances. A typical delivery drone is capable of traveling approximately 60 miles if it is only carrying a 5 lbs. payload. The average adult male weights approximately 180 pounds. In a combat scenario, a soldier may be carrying an additional 70 pounds of equipment. Most of the drones are only capable of delivery minor medical supplies and/or medicine to a desired area. It is worth noting that this technology does not involve the use of ground autonomous ambulances as disclosed in our present invention.

There has been an automated pilotless air ambulance that has been developed. The system includes an air vehicle (AV) having a fuselage coupled to a stretcher for carrying a patient. The system is configured to fly the patient from a point of injury to a medical treatment facility. The system also has a plurality of air lift motors for vertically lifting the air vehicle. The system further includes a plurality of air-lift motors coupled to the fuselage forming a low profile. The air lift motors are centralized motors or de-centralized motors for vertically lifting the AV. The system also has an automated life support and monitoring patient suite having a plurality of life support and monitoring devices, including medical supplies. The system additionally has a bidirectional datalink coupled to the air vehicle for executing various functions such as communicating with a patient's or a first responder's mobile device. Again, it is worth noting that this type of ambulance is an air ambulance and not a ground ambulance that is used to transport people to the nearest treatment facilities as described by the present disclosure.

There have been no reports in the patent literature on the development of a ground autonomous ambulance designed to transport patients to emergency room at treatment facilities. These autonomous ambulances described in the present disclosure perform many of the functions typically done by human ambulance drivers and paramedics. This frees up time for the paramedics to do the most important functions inside the ambulance that involves saving the lives of people.

SUMMARY OF THE INVENTION

To minimize the limitations in the prior art, and to minimize other limitations that will be apparent upon reading and understanding the present specification, the present invention pertains to the development of a ground autonomous ambulance that is designed to transport patients to the nearest treatment centers and to perform many of the functions that are typically performed by the ambulance driver and the paramedics. Some examples of these functions include driving the ambulance and using a robot as the stretcher to transport the patient from the residence or place of emergency to the ambulance.

The ground autonomous ambulance in the present invention is designed to follow routes comprising an autonomous vehicle that includes a drive by wire kit, a database storing a road network of possible routes, a database of rules of the road and/or other legal allowable behavior, sensors for detecting the road, pedestrians, cars, and other road obstacles, a control system that controls the vehicle to follow routes, and a method of carrying and securing a patient that may be in a stretcher, gurney, or wheelchair.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

DETAILED DESCRIPTION OF THE INVENTION

Figure 1:
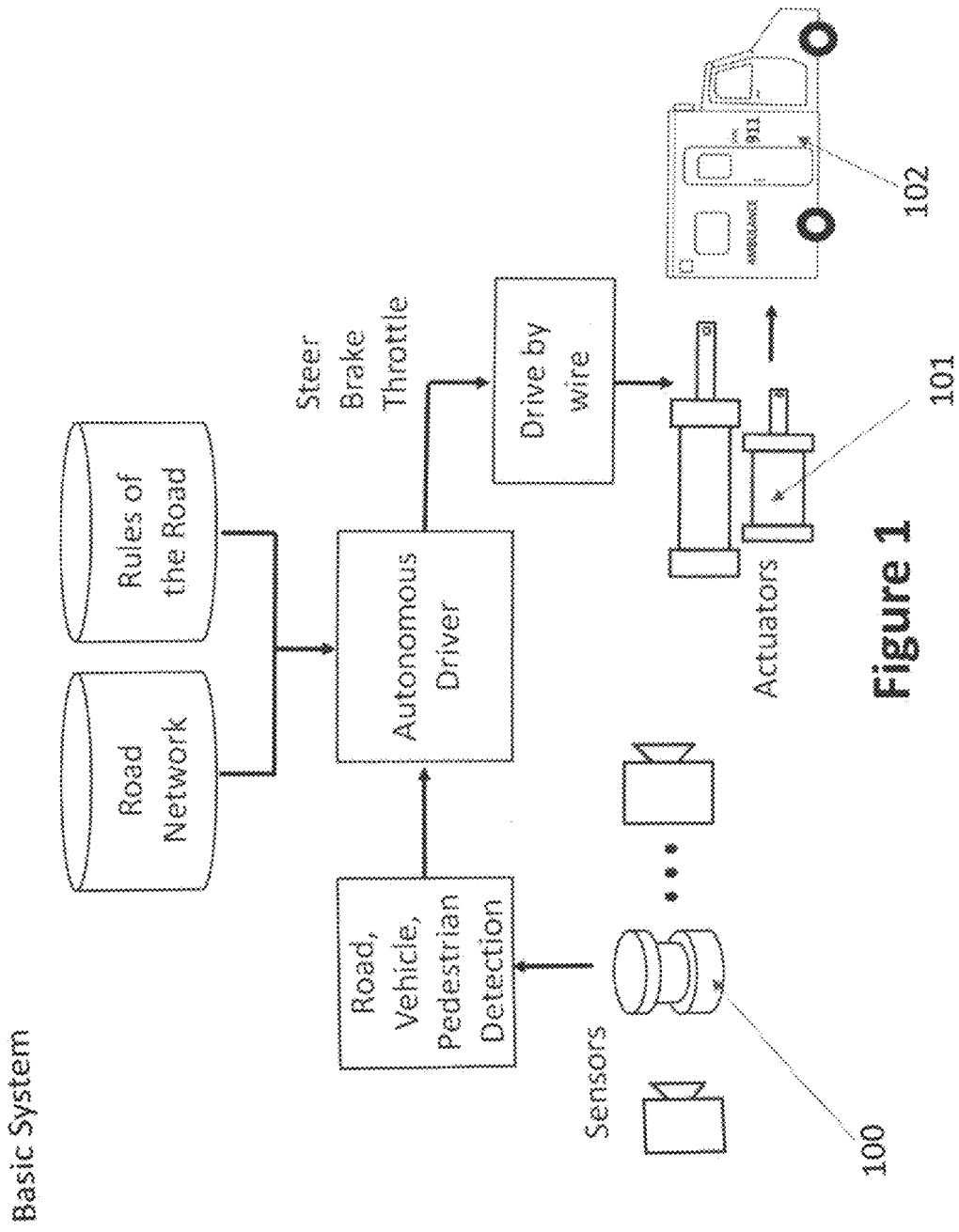
FIG. 1—Illustration of the basic system for the ground autonomous ambulance involving the sensors detecting the road, vehicle, and pedestrian and which the information is sent to the autonomous driver who also receives information from the database with the road network and the rules of the road. The autonomous driver is connected to a drive by wire system (steer, brake, throttle), which goes to the actuators and leads to the ground autonomous ambulance.

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

The term ground autonomous ambulance refers to the entire system all together. A vehicle is a device that is designed to transport a medical patient. The patient is the person that is picked up and transported and they may be in a gurney/stretcher or a wheelchair. The emergency location is defined as the location where the patient is, and it does not have to be a medical emergency. A hospital is the place where the patient is transported to and it might not be a hospital and could be any type of treatment center.

The present invention relates to a ground autonomous ambulance designed to follow routes that comprises an autonomous vehicle that includes a drive by wire kit, a database storing a road network of possible routes, a database of rules of the road and/or other legal allowable behavior, sensors for detecting the pedestrians, cars and other road obstacles, a control system that controls the vehicle to follow routes and a method of carrying and securing patient that may be in a stretcher or wheelchair.

The autonomous ambulance receives the location of the emergency from an emergency signal/call/communication for help or an alarm, and the controller uses the road network to select and follow a route that minimizes the time to the emergency location while still following the rules of the road.

The autonomous ambulance is further equipped with a mechanism that allows it to automatically open the back door or other doors and/or lift the wheelchair/gurney/stretcher.

The autonomous ambulance has health monitoring instruments on board.

The autonomous ambulance has a nurse/first responder, and/or other trained personnel in the back of the vehicle while the vehicle travels autonomously.

The autonomous ambulance uses its own sensors to create a map of the emergency location. The map can contain locations of doorways, windows, other vehicles, trees/vegetation, and humans/animals, etc. The system is capable of creating a report that can help the local or remote incident commander understand the scene, and aid with the first responding tasks.

The autonomous ambulance automatically positions itself to minimize the time needed to load the patient.

The autonomous ambulance positions the back of the ambulance close to a "break" in the cars parked by the side of the road to allow for the stretcher to squeeze in between the vehicles parked.

In the autonomous ambulance, the stretcher is also a robot that can drive towards the patient or other desired rea either automatically or by being controlled locally or remotely through the teleoperation or remote control.

The autonomous vehicle that has a set of emergency rules that allows it to overcome the standard rules of the road in emergency situations. For example, these extended set of rules may allow the ambulance to drive through a red light, exceed the speed limit, cross into oncoming traffic or stop in otherwise prohibited locations.

The autonomous system collects data in the form of video/pictures/audio or other sensor information to provide after action review mechanisms to understand the circumstances around the emergency. This data may include location of vehicles, locations of people, license plate numbers, etc. This may include data from sensors used for other tasks such as driving.

The autonomous ambulance system can signal or send commands to other vehicles in the vicinity to support the emergency operation such as moving out of the way, parking on the side of the road, etc.

In the autonomous ambulance system, the remote ambulance driver can remotely take over the autonomous ambulance. The remote operator may teleoperate the steering, accelerator, and/or brake of the autonomous vehicle. The remote operator may talk through a speakerphone.

the autonomous system can illuminate an area where the emergency procedure is being attempted. The autonomous system can call the police, other ambulance or fire/rescue vehicle given the particular detection.

The information for the detection, location, license plate, video, pictures, audio, and/or other sensor information is used to generate a report and sent to a centralized headquarters. The autonomous system has first responders personnel, medical personnel, or patient family onboard that is performing tasks unrelated to driving.

The autonomous system has sensors necessary for autonomous mobility that are also used for the detections. The detections are performed using cameras, thermal imagery, LADAR, or radar.

Thermographic cameras usually detect radiation in the long-infrared range of the electromagnetic spectrum and produce images of that radiation, called thermograms.

Laser Detection and Ranging (LADAR) is a surveying method that measures distance to a target by illuminating the target with laser light and measuring the reflected light with a sensor. Differences in laser return times and wavelengths can then be used to make digital 3-D representations of the target.

Radio Detection and Ranging (RADAR) is a detection system that uses radio waves to determine the range, angle, or velocity of objects. It can be used to detect aircraft, ships, spacecraft, guided missiles, motor vehicles, weather formations, and terrain.

The controller detects its environment using deep learning or other learning techniques to improve the classification capabilities of the system.

The autonomous ambulance is prepositioned at a location closer to a potential emergency area in order to minimize response time. The preposition location may be specified by an operator or computed by the control system.

The autonomous ambulance control parameters such as speed and/or accelerations are varied depending on the emergency affecting the patient. For example, the speeds may be set to maximum for a heart condition, and therefore invoking the emergency rules of the road. On the other hand, it may drive slowly and obey all the rules of the road while driving someone with a broken arm. A remote person can make determinations of the desired expediency levels.

The autonomous ambulance has a database of rules of the road and/or other behaviors that are encoded directly in the control system and are not sored in a separate database.

The autonomous ambulance can also be used to transport patients for a non-emergency condition and/or to a nonmedical location.

FIG. 1 shows sensors (100) that detect the road, vehicle, and pedestrians which lead to the autonomous driver which has a road network and a database of the rules of the road. The autonomous driver is connected to a drive by wire (steer, brake, throttle), which leads to actuators (101) that finally lead to the ground autonomous ambulance (102).

Figure 2:
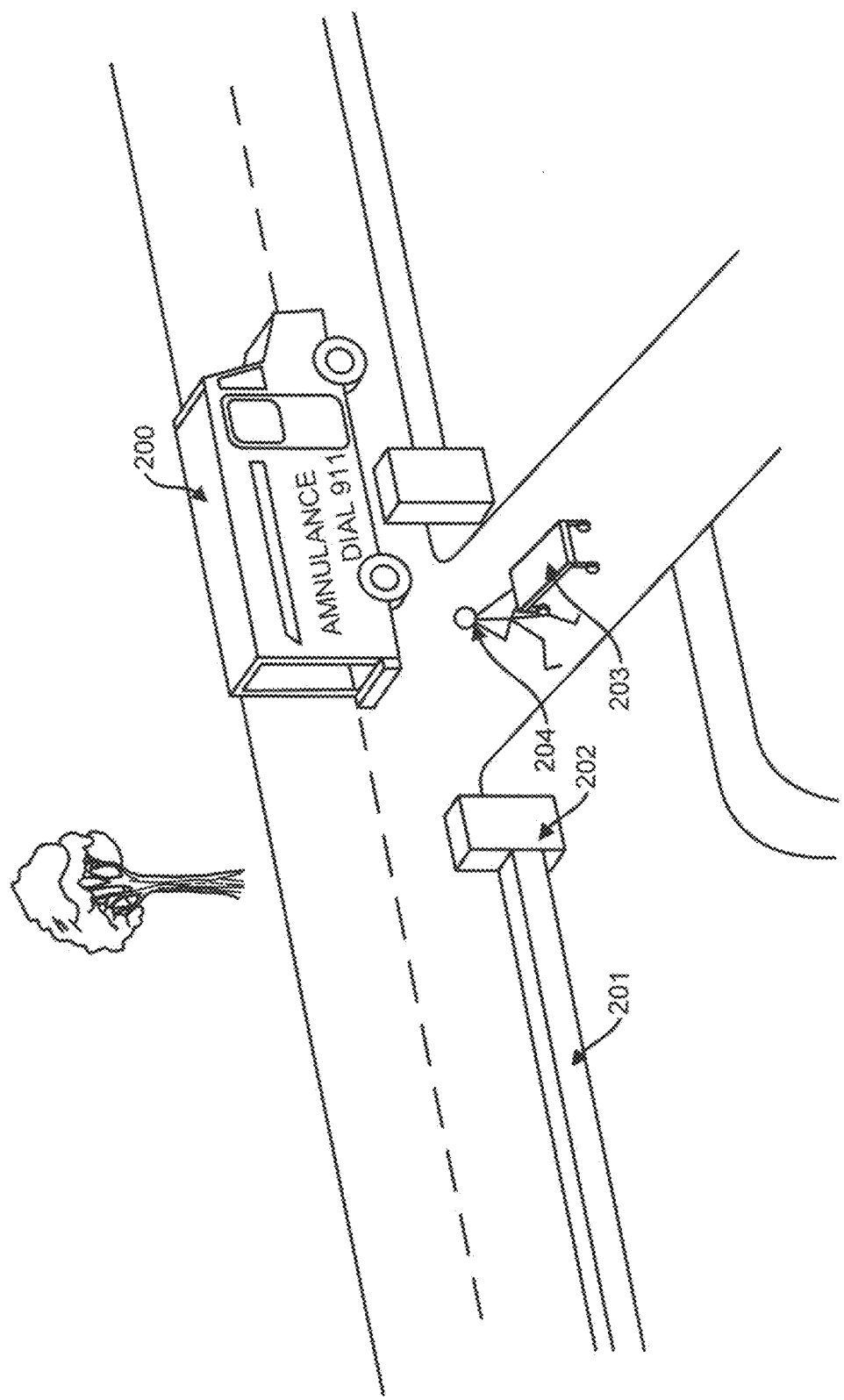
FIG. 2—Illustration of a paramedic transporting a stretcher to a place of residence to pick up the patient and then bring them back to the ambulance.

FIG. 2 shows the ground autonomous ambulance (200) which has the back of the ambulance open for the stretcher containing the patient to be placed. The paramedic (204) carries the stretcher (203) towards the place of residence of the patient and then carries the patient back in the stretcher to the ambulance. Obstacles (202) that are present near the ambulance are shown in the figure as well as vegetation (201). The ground autonomous ambulance (200) stops in locations that minimize the time needed to load the patient.

Figure 3:
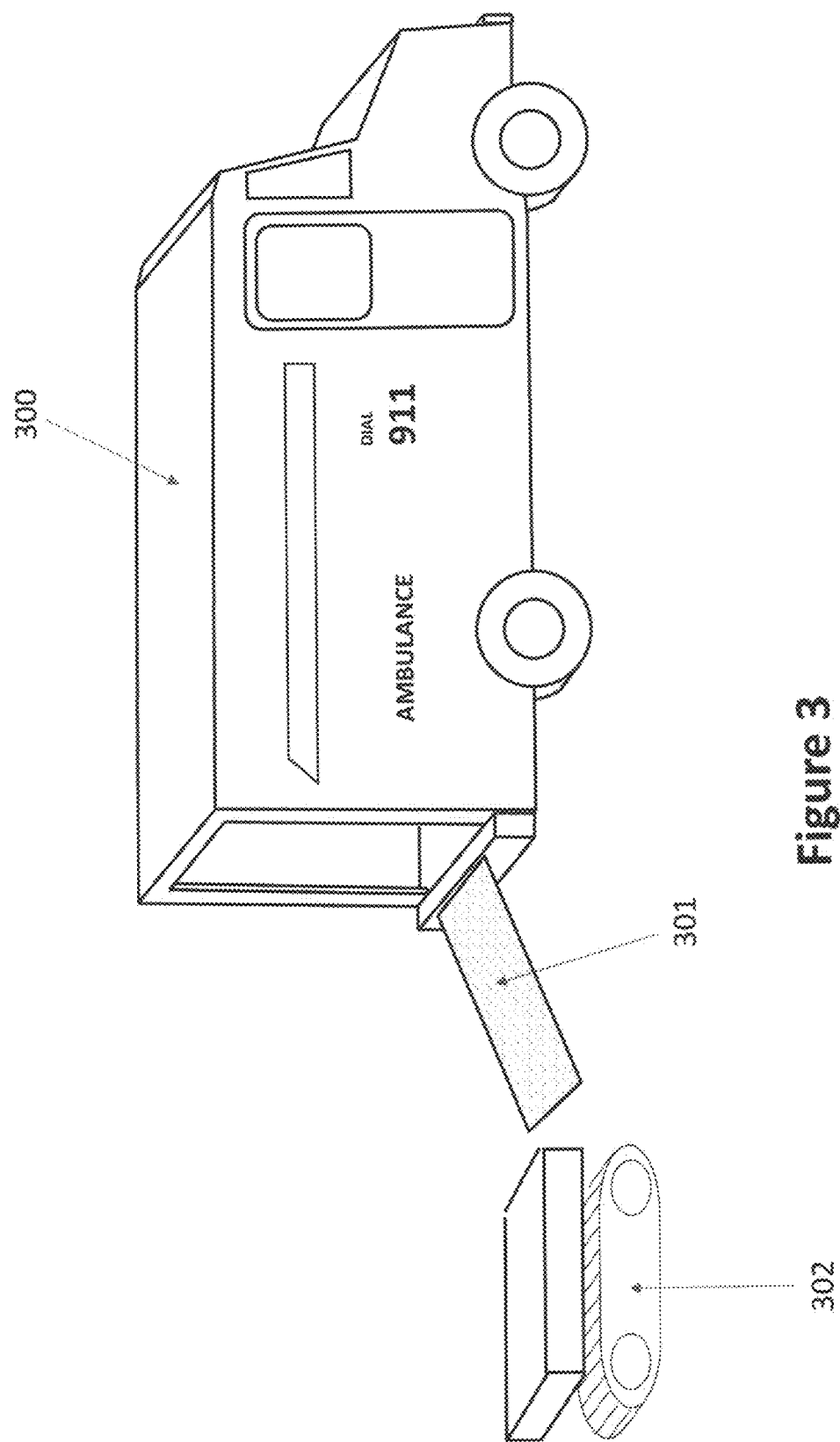
FIG. 3—Illustration of the case where the stretcher is a robot that can drive towards the patient or other desired area either automatically or by being controlled locally or remotely.

FIG. 3 illustrates a ground autonomous ambulance (300) with a ramp (301) at the back of the vehicle as well as a robot that serves as the autonomous stretcher (302). The stretcher (302) can be a robot that can drive towards the patient or other desired area either automatically or by being controlled locally or remotely.

Figure 4:
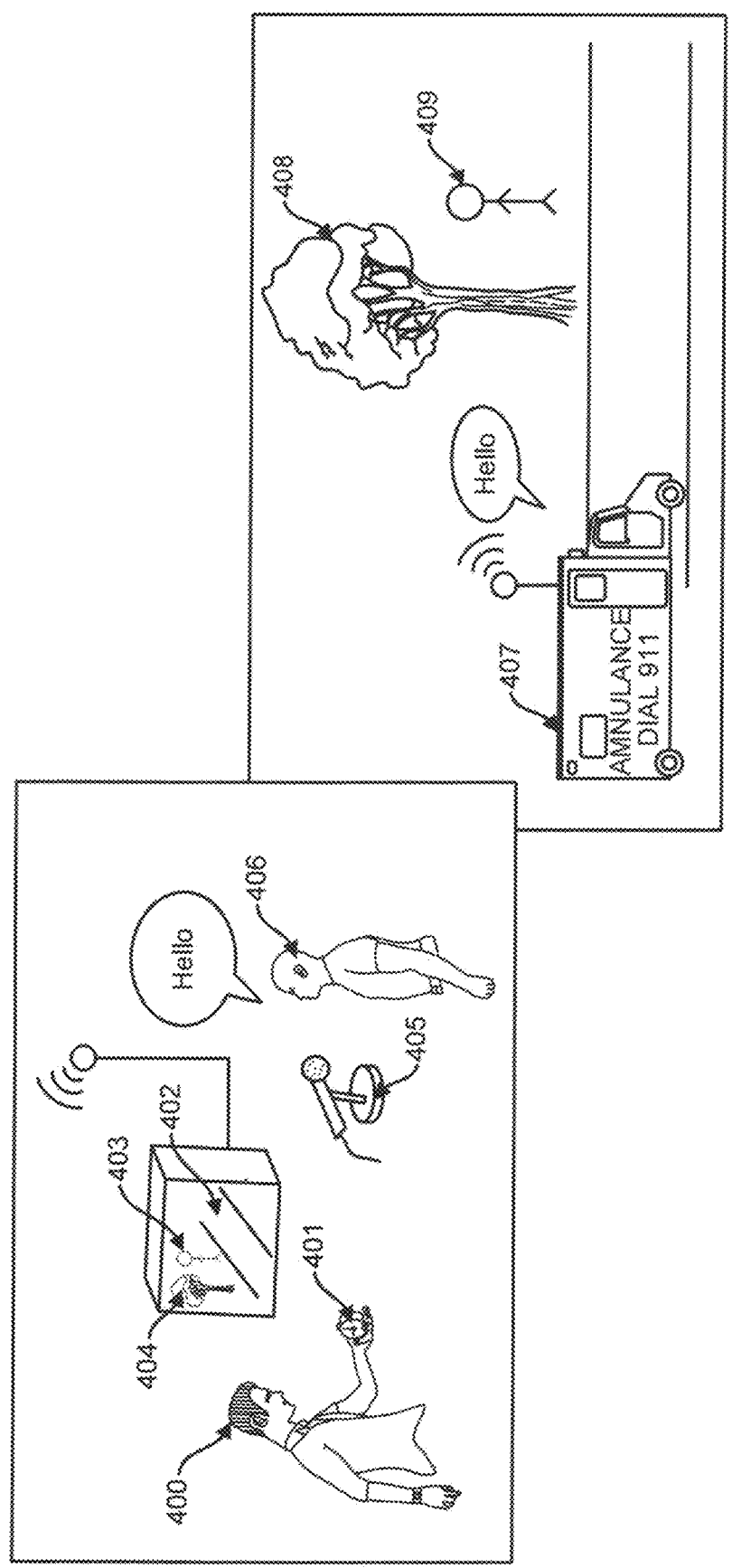
FIG. 4—Illustration in which the ground autonomous ambulance can be teleoperated or remote controlled. Speakers and microphones on the ambulance allow the operator to communicate with the people in the vicinity of the ambulance.

FIG. 4 shows that the ground autonomous ambulance shown on the right (407) can be teleoperated (401) to control the steering, accelerator, and brake. In the far left, there is an operator (400) that teleoperates the steering (401), accelerator, and/or brake of the ground autonomous ambulance on the right side. There is a view (402) of the scene on the right that guides the operator to perform the functions. In this view (402), the pedestrian (403) and tree (404) on the right can be seen. There is also an operator (406) who speaks into a speakerphone or a microphone (405). On the right, the actual scene where the ground autonomous ambulance (407) is located is shown and the teleoperated steering (401), acceleration, and brake are displayed as well as the communications via the microphone (405). The actual scene where the pedestrian (409) and the tree (408) is present is shown on the right side. The ground autonomous ambulance may be teleoperated or remote controlled. Speakers and microphones on the ground autonomous ambulance allow the operator to communicate with the people in the vicinity of the ambulance.

Figure 5:
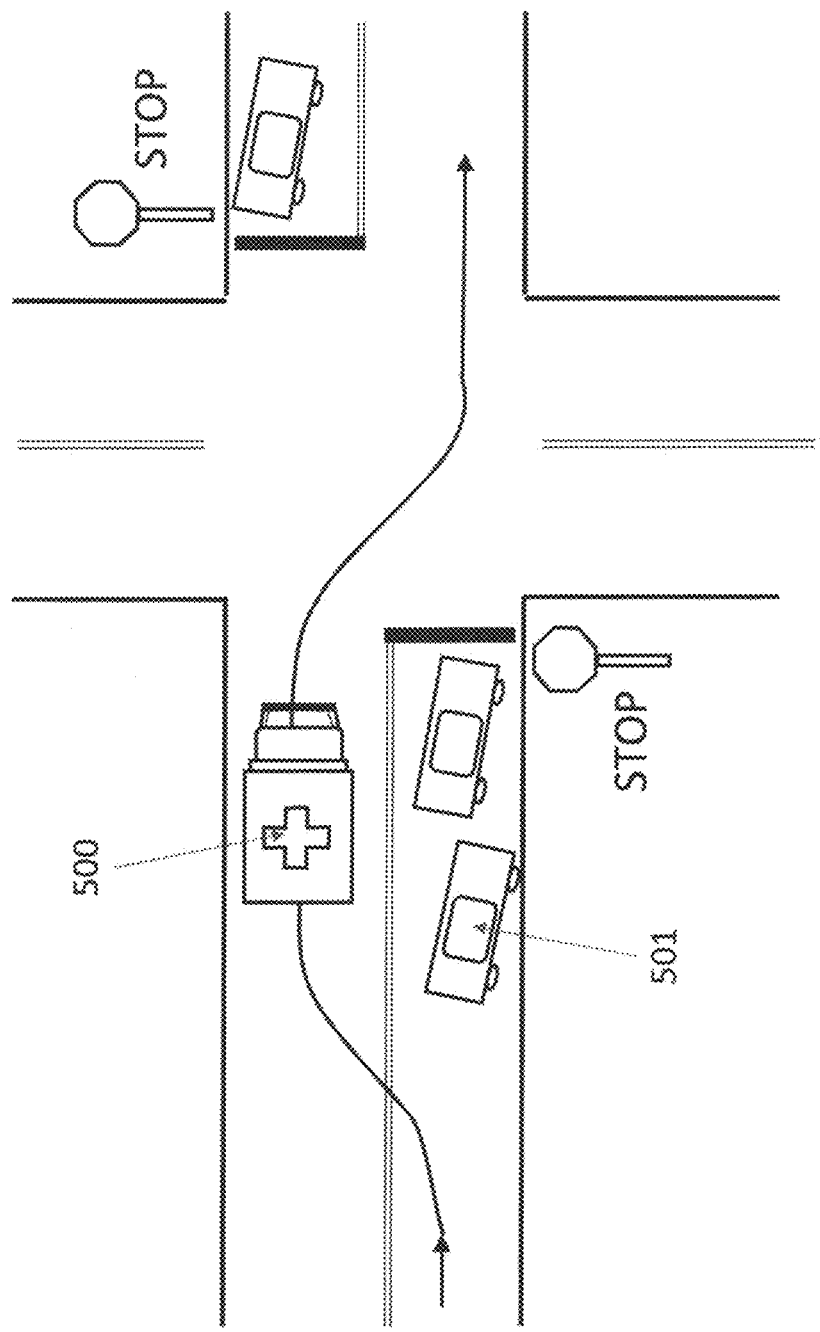
FIG. 5—Illustration of the ground autonomous ambulance driving using emergency rules when there is a medical emergency associated with the patient. These emergency rules include running red lights or crossing double yellow lines.

FIG. 5 shows that during transportation in an emergency the ambulance may drive using the emergency rules such as running red lights, or crossing double yellow lines. Here, the figure illustrates that the ground autonomous ambulance (500) bypasses cars (501) stopped by the side of the road (502) and proceeds ahead without stopping at the stop sign (503).

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims. Note with respect to the materials of construction, it is not desired nor intended to thereby unnecessarily limit the present invention by reason of such disclosure.

We claim:

1. An autonomous ambulance system comprising:
 a ground vehicle having:
  a patient compartment in which a stretcher, gurney, or wheelchair carrying a patient can be secured; and
  one or more back doors that provide access to the patient compartment;
 a drive-by-wire kit installed in the ground vehicle;
 one or more sensors mounted on the ground vehicle and configured to detect a road traversed by the ground vehicle and obstacles within the road;
 one or more databases storing data indicating (i) a road network of possible routes and (ii) rules of the road or legal allowable behavior;
 one or more first mechanisms coupled to the one or more back doors; and
 a control system operatively coupled to the one or more sensors, the drive-by-wire kit, the one or more databases, and the one or more first mechanisms,
 wherein the control system is operable to execute stored instructions to:
  control, via the drive-by-wire kit, the ground vehicle to follow a route in the road network; and
  automatically open, via the one or more first mechanisms, the one or more back doors.

2. The autonomous ambulance system of claim 1, wherein the control system is further operable to execute stored instructions to:
 receive a location of an emergency from an emergency signal/call/communication for help or an alarm; and
 select, based on the received location and the data in the one or more databases, a route that minimizes time to the location while still following the rules of the road.

3. The autonomous ambulance system of claim 1, further comprising one or more health monitoring instruments within the patient compartment.

4. The autonomous ambulance system of claim 1, wherein the control system is further operable to execute additional stored instructions to:
 create, based on signals from the one or more sensors, a map of an emergency location.

5. The autonomous ambulance system of claim 1, wherein the control system is further operable to execute additional stored instructions to:
 position, via the drive-by-wire kit, the ground vehicle to minimize a time for loading the patient into the patient compartment.

6. The autonomous ambulance system of claim 1, wherein the control system is further operable to execute additional stored instructions to:
 collect and store, based on signals from the one or more sensors, data indicative circumstances surrounding an emergency.

7. The autonomous ambulance system of claim 1, wherein the control system is further operable to execute additional stored instructions to communicate with other vehicles to support an emergency operation.

8. The autonomous ambulance system of claim 1, further comprising a light mounted on the ground vehicle, wherein the control system is further operable to execute stored instructions to control the light to automatically illuminate an area where an emergency procedure is being attempted.

9. The autonomous ambulance system of claim 1, wherein the one or more sensors comprises one or more cameras, one or more thermal imagers, a laser detection and ranging (LADAR) system, a radio detection and ranging (RADAR) system, or any combination of the foregoing.

10. The autonomous ambulance system of claim 1, wherein the control system is configured to employ deep learning for classification of features detected by the one or more sensors.

11. An autonomous ambulance system comprising:
a ground vehicle having a patient compartment in which a stretcher, gurney, or wheelchair carrying a patient can be secured;
a drive-by-wire kit installed in the ground vehicle;
one or more sensors mounted on the ground vehicle and configured to detect a road traversed by the ground vehicle and obstacles within the road;
one or more databases storing data indicating (i) a road network of possible routes, (ii) rules of the road or legal allowable behavior, and (iii) a set of emergency rules that override the rules of the road in emergency situations; and
a control system operatively coupled to the one or more sensors, the drive-by-wire kit, and the one or more databases,
wherein the control system is operable to execute stored instructions to control, via the drive-by-wire kit, the ground vehicle to follow a route in the road network based on the data stored in the one or more databases, and
wherein the set of emergency rules comprises rules for running red lights, exceeding a speed limit, crossing into oncoming traffic, or stopping in otherwise prohibited locations.

12. The autonomous ambulance system of claim 11, wherein the control system is further operable to execute stored instructions to:
receive a location of an emergency from an emergency signal/call/communication for help or an alarm; and
select, based on the received location and the data in the one or more databases, a route that minimizes time to the location while still following the rules of the road.

13. The autonomous ambulance system of claim 11, further comprising one or more health monitoring instruments within the patient compartment.

14. The autonomous ambulance system of claim 11, wherein the control system is further operable to execute additional stored instructions to position, via the drive-by-wire kit, the ground vehicle to minimize a time for loading the patient into the patient compartment.

15. The autonomous ambulance system of claim 11, wherein the control system is further operable to execute additional stored instructions to communicate with other vehicles to support an emergency operation.

16. An autonomous ambulance system comprising:
a ground vehicle having a patient compartment in which a stretcher, gurney, or wheelchair carrying a patient can be secured;
a drive-by-wire kit installed in the ground vehicle;
one or more sensors mounted on the ground vehicle and configured to detect a road traversed by the ground vehicle and obstacles within the road;
one or more databases storing data indicating (i) a road network of possible route and (ii) rules of the road or legal allowable behavior; and
a control system operatively coupled to the one or more sensors, the drive-by-wire kit, and the one or more databases,
wherein the control system is operable to execute stored instructions to control a speed, an acceleration, or both of the ground vehicle in following a route based on an emergency affecting the patient.

17. The autonomous ambulance system of claim 16, wherein the control system is further operable to execute stored instructions to:
receive a location of an emergency from an emergency signal/call/communication for help or an alarm; and
select, based on the received location and the data in the one or more databases, a route that minimizes time to the location while still following the rules of the road.

18. The autonomous ambulance system of claim 16, further comprising one or more health monitoring instruments within the patient compartment.

19. The autonomous ambulance system of claim 16, wherein the control system is further operable to execute additional stored instructions to position, via the drive-by-wire kit, the ground vehicle to minimize a time for loading the patient into the patient compartment.

20. The autonomous ambulance system of claim 16, wherein the control system is further operable to execute additional stored instructions to communicate with other vehicles to support an emergency operation.

* * * * *